United States Patent
Fath et al.

(10) Patent No.: US 9,914,419 B2
(45) Date of Patent: Mar. 13, 2018

(54) RADAR MOUNTING DEVICE

(71) Applicant: FORD GLOBAL TECHNOLOGIES, LLC, Dearborn, MI (US)

(72) Inventors: Brian Fath, Farmington Hills, MI (US); David James Lawor, Bloomfield Hills, MI (US); Scott Howard Gaboury, Ann Arbor, MI (US); Muhammad Azhar Aleem, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/695,820

(22) Filed: Apr. 24, 2015

(65) Prior Publication Data

US 2015/0283969 A1    Oct. 8, 2015

Related U.S. Application Data

(62) Division of application No. 13/858,259, filed on Apr. 8, 2013, now Pat. No. 9,038,876.

(51) Int. Cl.
*B60R 21/00* (2006.01)
*B60R 9/06* (2006.01)
(Continued)

(52) U.S. Cl.
CPC ............ *B60R 21/00* (2013.01); *B60R 9/06* (2013.01); *G01S 13/931* (2013.01);
(Continued)

(58) Field of Classification Search
CPC ...... B60R 9/06; B60R 19/483; H01Q 1/3233; Y10T 29/49778; Y10T 29/4978; Y10T 29/49948; Y10T 29/49963; Y10T 29/49964; F16B 5/0225; F16B 5/0233; F16B 5/0216
(Continued)

(56) References Cited

U.S. PATENT DOCUMENTS 2,876,485 A * 3/1959 Cowles ................. A47C 7/002
                                             16/42 R
2,974,558 A    3/1961 Hodell
(Continued)

FOREIGN PATENT DOCUMENTS

CA    1166876 A1    5/1984
CN    2869882 Y     2/2007
(Continued)

OTHER PUBLICATIONS

1st Office Action in Corresponding Chinese Patent Application No. 201410138119.5 dated Feb. 3, 2017, translation provided by Lian & Lien IP Attorneys, 13 pages.

*Primary Examiner* — Jason L Vaughan
(74) *Attorney, Agent, or Firm* — Frank MacKenzie; Brooks Kushman, P.C.

(57) ABSTRACT

An exemplary radar mounting device for attaching a component to a vehicle body may include a resilient grommet secured within an opening formed in the component. The device may also have a stud for attachment to the vehicle body. The stud may have a ball portion received within the resilient grommet for attaching the component to the stud. In addition, the device may have a nut fastened to the stud to secure the component to the stud.

10 Claims, 5 Drawing Sheets

(51) Int. Cl.
*H01Q 1/32* (2006.01)
*G01S 13/93* (2006.01)
*B60R 19/48* (2006.01)
*G01S 7/02* (2006.01)

(52) U.S. Cl.
CPC .......... *H01Q 1/3233* (2013.01); *B60R 19/483* (2013.01); *B60R 2021/0027* (2013.01); *G01S 2007/027* (2013.01); *G01S 2013/9389* (2013.01); *Y10T 29/49778* (2015.01); *Y10T 29/49826* (2015.01); *Y10T 29/49963* (2015.01)

(58) Field of Classification Search
USPC ........ 224/489, 555, 557, 929; 411/389, 537, 411/85, 103, 111, 112, 113; 403/337, 403/408; 362/460, 507
See application file for complete search history.

(56) References Cited

U.S. PATENT DOCUMENTS

| | | | | |
|---|---|---|---|---|
| 3,037,542 A * | 6/1962 | Boyd | F16B 5/0208 | 411/105 |
| 3,797,755 A * | 3/1974 | Saisho | A01G 25/023 | 239/547 |
| 3,823,314 A * | 7/1974 | Germany | B60Q 1/0683 | 362/419 |
| 4,352,589 A | 10/1982 | Allison et al. | | |
| 4,358,098 A | 11/1982 | Ceseri | | |
| 4,403,377 A * | 9/1983 | Mizusawa | F16B 19/1081 | 24/297 |
| 4,405,272 A * | 9/1983 | Wollar | F16B 19/1081 | 411/41 |
| 4,471,413 A * | 9/1984 | Dick | B60Q 1/0683 | 362/273 |
| 4,722,029 A * | 1/1988 | Ahle | B60Q 1/0683 | 362/341 |
| 4,757,664 A * | 7/1988 | Freissle | B07B 1/4645 | 16/2.1 |
| 4,831,502 A * | 5/1989 | Fujino | B60Q 1/0041 | 362/297 |
| 4,843,523 A * | 6/1989 | Nakamura | B60Q 1/0683 | 362/273 |
| 4,916,587 A * | 4/1990 | Hirose | B60Q 1/076 | 362/273 |
| 4,927,287 A * | 5/1990 | Ohkawa | F16B 21/086 | 24/297 |
| 4,952,106 A * | 8/1990 | Kubogochi | F16B 19/1081 | 411/48 |
| 4,952,107 A * | 8/1990 | Dupree | F16B 41/002 | 411/103 |
| 4,978,264 A * | 12/1990 | Philippe | B60Q 1/0433 | 411/26 |
| 5,003,436 A * | 3/1991 | Yamada | B60Q 1/0683 | 362/420 |
| 5,032,965 A * | 7/1991 | Weber | B60Q 1/0683 | 362/428 |
| 5,077,642 A * | 12/1991 | Lisak | F21S 48/1757 | 362/289 |
| 5,094,579 A * | 3/1992 | Johnson | F02B 77/00 | 411/107 |
| 5,228,768 A * | 7/1993 | Suzuki | B60Q 1/0686 | 362/273 |
| 5,541,815 A * | 7/1996 | Nakamura | B60Q 1/0683 | 362/273 |
| 5,562,375 A * | 10/1996 | Jackson | F16B 19/1081 | 411/48 |
| 5,573,326 A * | 11/1996 | Iijima | B60Q 1/0683 | 362/273 |
| 5,580,204 A * | 12/1996 | Hultman | F16B 5/065 | 24/297 |
| 5,641,255 A * | 6/1997 | Tanaka | F16B 19/1081 | 411/45 |
| 5,647,659 A * | 7/1997 | Mori | B60Q 1/0683 | 362/273 |
| 5,707,133 A * | 1/1998 | Burton | B60Q 1/0686 | 116/281 |
| 5,846,040 A * | 12/1998 | Ueno | F16B 19/1081 | 411/369 |
| 5,951,157 A * | 9/1999 | Shirai | B60Q 1/0683 | 362/284 |
| 6,290,379 B1 * | 9/2001 | Iwasaki | B60Q 1/0683 | 362/289 |
| 6,324,731 B1 * | 12/2001 | Pliml, Jr. | F16B 19/1081 | 24/297 |
| 6,345,905 B1 * | 2/2002 | Kibayashi | B60Q 1/076 | 362/460 |
| 6,499,714 B1 * | 12/2002 | Wike | F16B 5/0258 | 248/632 |
| 6,769,849 B2 * | 8/2004 | Yoneoka | F16B 5/0642 | 411/41 |
| 6,954,174 B2 * | 10/2005 | Isaji | G01S 7/4026 | 180/167 |
| 7,148,838 B2 * | 12/2006 | Kakishita | G01S 7/03 | 342/175 |
| 7,207,758 B2 * | 4/2007 | Leon | F16B 21/02 | 411/45 |
| 7,244,085 B2 * | 7/2007 | Dobson | H02G 3/083 | 16/2.1 |
| 7,249,922 B2 * | 7/2007 | Yoneoka | F16B 19/1081 | 411/41 |
| 7,621,557 B2 | 11/2009 | Tracht et al. | | |
| 7,914,186 B2 * | 3/2011 | Tatara | B60Q 1/072 | 362/39 |
| 7,988,212 B2 * | 8/2011 | Hartley | B60R 19/483 | 293/117 |
| 8,142,485 B2 * | 3/2012 | Buhren | A61B 17/8033 | 606/289 |
| 8,511,727 B2 * | 8/2013 | Hartley | B60R 19/483 | 293/117 |
| 8,882,421 B2 * | 11/2014 | Sasaki | F16B 19/1081 | 24/297 |
| 8,973,278 B2 * | 3/2015 | Ham | G01B 5/24 | 33/286 |
| 9,038,876 B2 * | 5/2015 | Aleem | B60R 9/06 | 224/489 |
| 9,276,308 B2 * | 3/2016 | Meinel | H01Q 1/3233 | |
| 9,377,135 B2 * | 6/2016 | Karls | F16L 3/222 | |
| 2008/0130301 A1 * | 6/2008 | Kusagaya | B60Q 1/076 | 362/466 |
| 2008/0179900 A1 * | 7/2008 | Hartley | B60R 19/483 | 293/117 |
| 2011/0247194 A1 * | 10/2011 | Hartley | B60R 19/483 | 29/466 |
| 2012/0007764 A1 | 1/2012 | Kawasaki et al. | | |
| 2013/0239425 A1 * | 9/2013 | Ham | G01B 5/24 | 33/533 |
| 2014/0165368 A1 * | 6/2014 | Cordova | H02G 3/121 | 29/525.11 |
| 2014/0299644 A1 * | 10/2014 | Aleem | B60R 9/06 | 224/555 |
| 2014/0375490 A1 * | 12/2014 | Pfitzenmaier | G01S 7/032 | 342/4 |
| 2015/0069193 A1 * | 3/2015 | Meinel | H01Q 3/04 | 248/188.4 |
| 2015/0283969 A1 * | 10/2015 | Fath | B60R 9/06 | 29/525.11 |

FOREIGN PATENT DOCUMENTS

| | | | | |
|---|---|---|---|---|
| EP | | 0341853 A1 | 11/1989 | |
| JP | | 2005090681 A | 4/2005 | |
| WO | WO 2013092143 A1 * | | 6/2013 | ............. G01S 7/032 |

\* cited by examiner

RADAR MOUNTING DEVICE

CROSS-REFERENCE TO RELATED APPLICATIONS

This application is a division of U.S. application Ser. No. 13/858,259 filed Apr. 8, 2013, issued as U.S. Pat. No. 9,038,876, the disclosure of which is hereby incorporated in its entirety by reference herein.

BACKGROUND

Vehicles may have Forward Looking Radars (FLRs) to scan traffic and obstacles for distances of up to 100 meters or more forward of the vehicle. FLRs and related radar based systems may be components of vehicle systems configured to provide Adaptive Cruise Control (ACC), Forward Collision Warning (FCW), Collision Mitigation by Braking (CMbB) and other vehicle functions. These functions can be accomplished by accurate target tracking and vehicle path prediction based on data received by the FLRs. Furthermore, the accuracy by which FLRs collect such data requires that the FLRs' field of view is aligned with a vehicle thrust axis and positioned parallel to the ground. To that end, FLRs may be attached to vehicles by somewhat large brackets with multiple attachment points. In addition, adjustment of the FLRs on the vehicle can be somewhat burdensome by requiring, for example, installation offsite at a supplier facility rather than in an assembly line at an assembly plant. Furthermore, some FLRs may need adjustment in the assembly plant due to variations in vehicle height and stance, thereby increasing manufacturing cycle time for those vehicles.

A need exists for an attachment device and process for installing an FLR or other component to a vehicle within narrow tolerances, while decreasing costs and minimizing overall vehicle weight.

SUMMARY

One embodiment of a radar mounting device for attaching a component to a vehicle body may include a resilient grommet secured within an opening formed in the component. The device may also have a stud for attachment to the vehicle body. The stud may have a ball portion received within the resilient grommet for attaching the component to the stud. In addition, the device may have a nut fastened to the stud to secure the component to the stud.

Another embodiment of a radar mounting device may include a plurality of resilient grommets secured within a plurality of openings formed in a radar module. The device may further have a plurality of studs for attachment to a vehicle bumper, with each stud having a ball portion received within the resilient grommets for attaching the radar module to the studs. The device may also have a plurality of nuts fastened to the studs to secure the radar module to the studs.

One embodiment of a process for operating a radar mounting device to install a radar module on a vehicle bumper may include attaching a plurality of studs of the radar mounting device to the vehicle bumper. The process may also include hanging the radar module on the plurality of studs. In addition, the process may further include fastening a plurality of grommets carried by the radar module to the plurality of studs. Moreover, the process may include align the radar module in a vertical direction.

DETAILED DESCRIPTION

Figure 1:
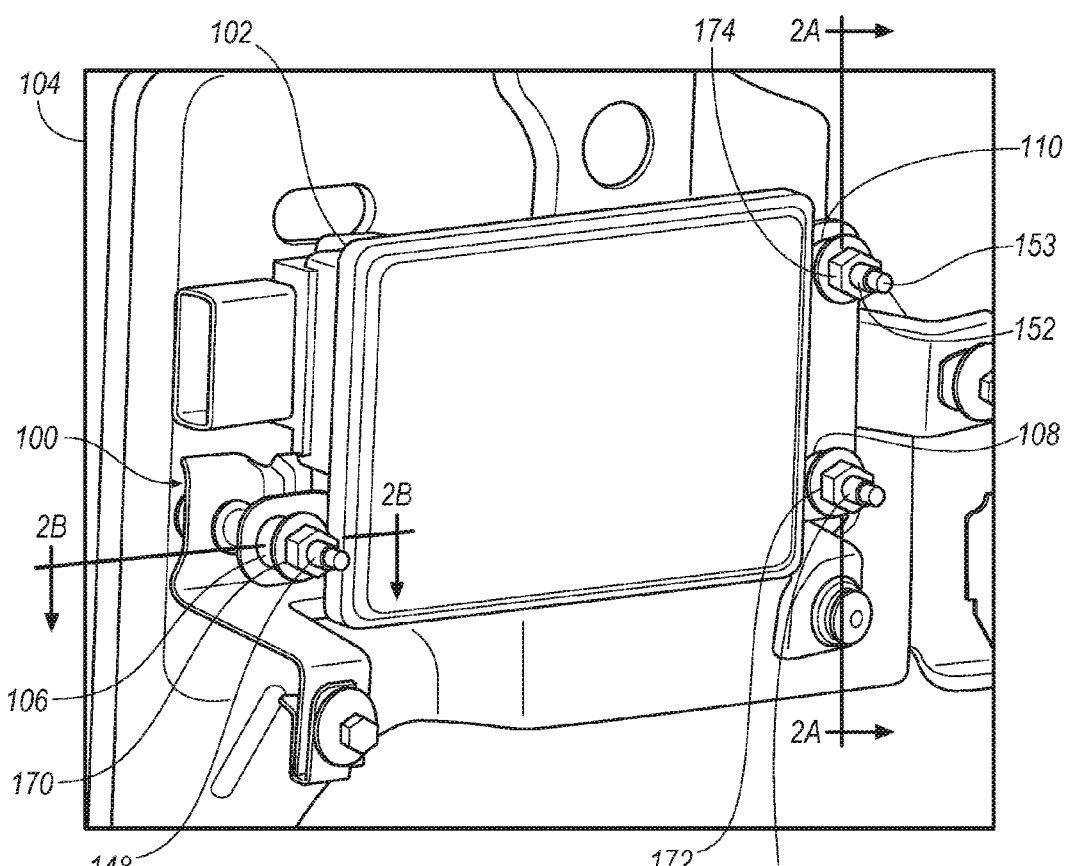
FIG. 1 illustrates an exemplary perspective view of a radar mounting device utilized for installing a radar module onto a vehicle bumper.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

An exemplary radar mounting device may include a series of grommets secured within openings formed in a radar module to permit a snap-fit engagement with a series of ball studs extending from a vehicle bumper. The device may further include a series of nuts engaged to the ball studs to facilitate with holding radar module on the studs. The nuts may have flanges that compress the grommets against ball portions of the studs so as to secure the radar module to the studs. At least a portion of the nuts may be spaced apart from the grommets during installation to permit adjustment of the radar module on the vehicle bumper. In other embodiments, the radar mounting device may be used to mount other components to other bodies, aside from mounting a radar module to a vehicle bumper.

Figure 2A:
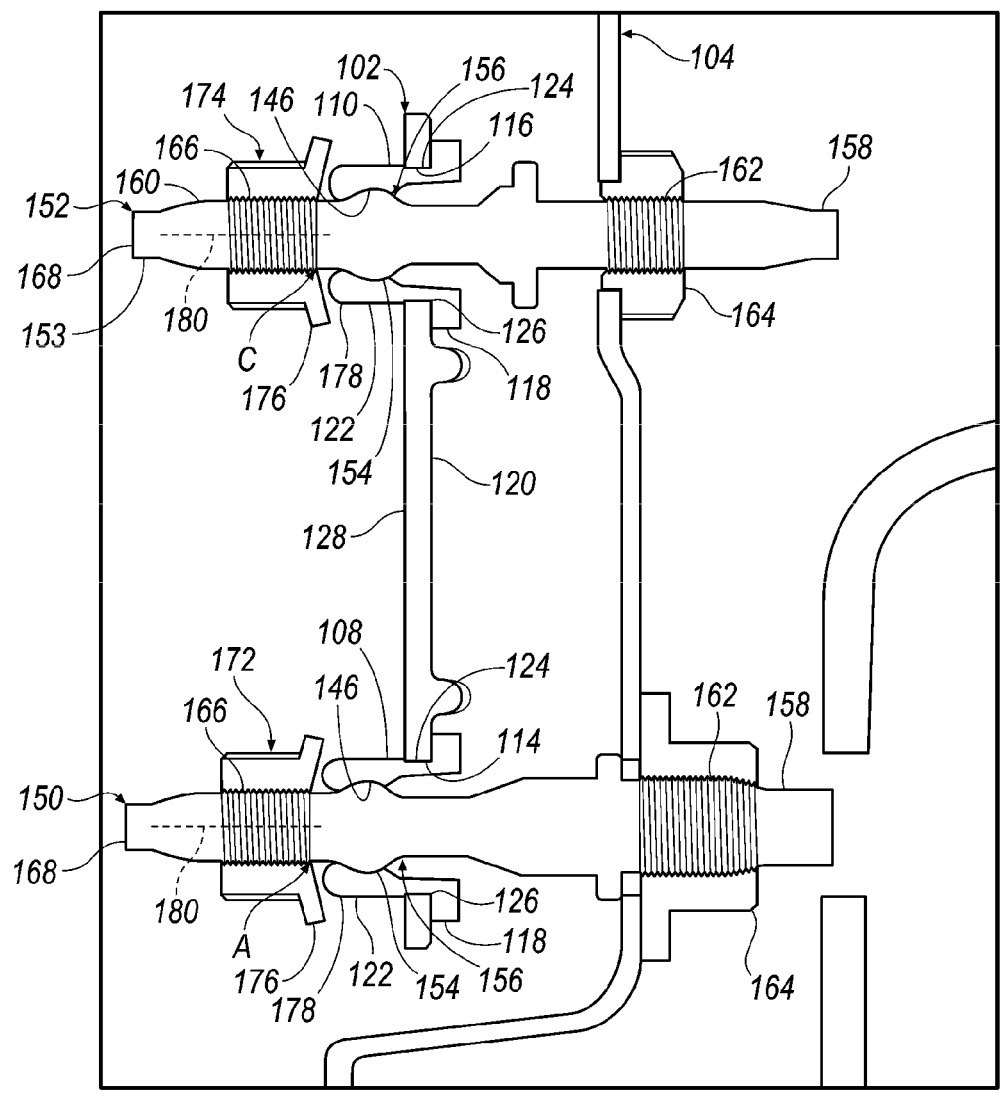
FIG. 2A illustrates a cross-sectional view of the device, as taken along line 2A-2A of FIG. 1.
Figure 2B:
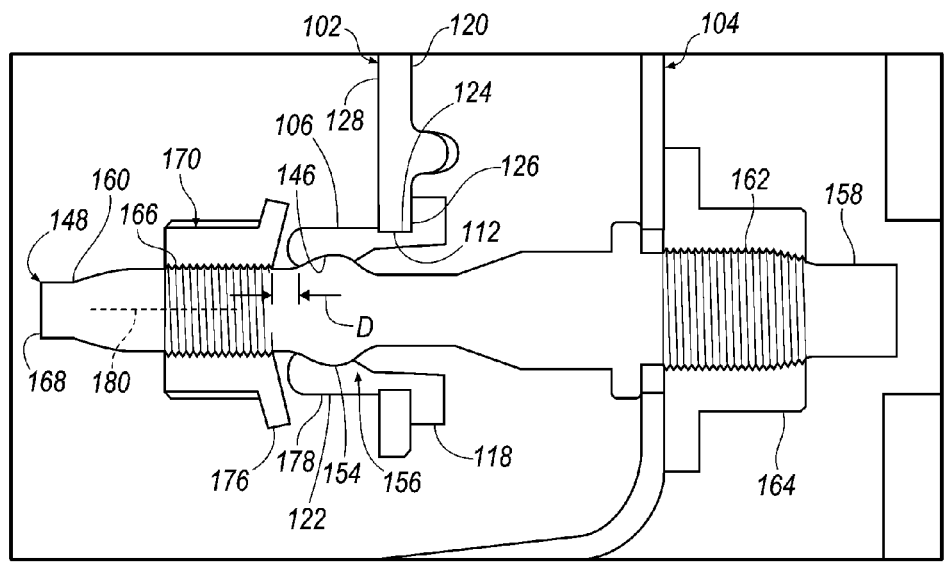
FIG. 2B illustrates a cross-sectional view of the device, as taken along line 2B-2B of FIG. 1.
Figure 3:
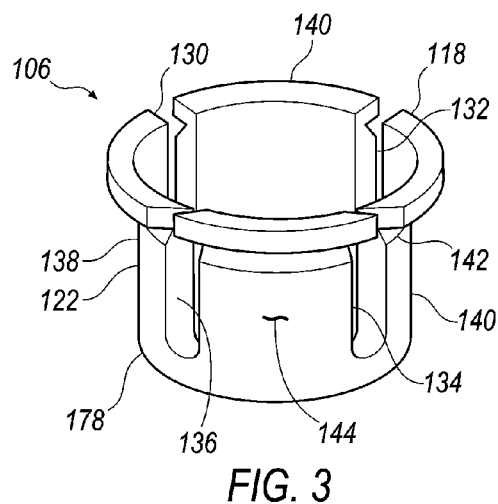
FIG. 3 illustrates an enlarged perspective view of one grommet for the device of FIG. 1.

Referring to FIGS. 1 through 3, one embodiment of a radar mounting device 100 for attaching a radar module 102 to a vehicle bumper 104 or other vehicle body, may include three resilient grommets 106, 108, 110 secured within respective openings 112, 114, 116 formed in the radar module 102. As best shown in FIGS. 2A and 2B, each grommet may include a circumferential flange 118 that may engage a first surface 120 of the radar module adjacent the opening to prevent axial movement of the grommet through the opening. Further, each grommet may have a cylinder portion 122 extending from the flange 118 and including a recessed channel 124 for receiving an inner rim 126 of the module 102, which defines the respective opening. The recessed channel may engage the inner rim 126, a portion of the first surface 120 and a portion of a second surface 128 opposite to the first surface, to further prevent the grommet from moving through the opening in either axial direction. As best shown in FIG. 3, each grommet may have four spaced apart slots 130, 132, 134, 136 to provide four resilient tabs 138, 140, 142, 144 that are movable radially inward and outward with respect to an axis 180 of the cylinder portion 122. In addition, each grommet may have a seat 146 (FIGS. 2A and 2B), which is disposed at an end of the cylinder portion 122 opposite to the circumferential flange 118 and utilized for attachment to the stud as detailed below. It will be appreciated that the device may have more or less than three grommets with more or less than four tabs and other structural features.

The device 100 may further include three studs 148, 150, 152 attached to the vehicle bumper 104, each having a ball portion 154 received within a respective one of the resilient grommets for securing the radar module 102 to the studs. For example, the tabs 138, 140, 142, 144 or other portions of each grommet may resiliently expand radially outward as the ball portion 154 is initially received within the grommet and then contract radially inward around the ball portion 154, when the ball portion 154 is received within the seat 146 of the grommet. In this respect, the grommet may resiliently hold the radar module 102 on the ball portions 154 of the studs.

Each ball portion 154 may be formed on an intermediate portion 156 of each stud between first and second end portions 158, 160. The first end portion 158 of each stud has a first threaded fastener 162 that is fastened to a threaded weld nut 164 or other threaded body carried by the vehicle bumper 104. The second end portion 160 may also have a second threaded fastener 166 on a side of the ball portion 154 opposite to the bumper and extending from a tip 168 of the stud to an axial position A on the stud that is spaced apart by a predetermined distance. Of course, the device may have more or less than three studs associated with the same number of openings in the bumper and may also have other structural features.

Studs 148, 150 may be secured to the bumper and held in fixed positions at an equal height with respect to the ground, so as to provide the radar module with an accurate horizontal scope. Furthermore, stud 152 may include the first threaded fastener 162 being selectively engaged to the weld nut 164 or other portion of the bumper to permit axial adjustment of the stud and radar module with respect to the bumper, which may in turn permit accurate adjustment of the vertical scope of the radar module. To that end, stud 152 may have a tip formed a hexagonal head 153 to permit tooling to apply a torque to the stud.

The device 100 may include three nuts 170, 172, 174 fastened to a respective one of studs 148, 150, 152 to secure the radar module 102 to those studs. In particular, each threaded nut may be engaged with the second threaded fastener 166 of the respective stud. Further, each of nuts 170, 172 may have a frustroconical flange 176 extending toward the grommet and engaging an end portion 178 of the respective grommet. In this respect, the flange 176 may compress the end portion 178 of the grommet radially inward around the ball portion 154 and secure the grommet to the ball portion 154, thereby facilitating the grommet with mounting the radar module 102 to the studs. The second threaded fastener 166 may be spaced apart from the ball portion 154 and terminate at an end spaced apart by a predetermined distance D from the ball portion 154 in order to prevent the nut from being over-torqued in a manner that may damage the grommet or threading. In addition, a torque wrench may be utilized to apply a predetermined torque to the nut so as to prevent such damage to the device.

The nuts may also include nut 174, which during installation is spaced apart from the ball portion 154 on stud 152 by a predetermined clearance C, to permit additional adjustment of the radar module 102 on the stud, and in turn allow an installation operator to adjust the vertical scope of the radar module. As an example, the nut 174 may be turned or rotated on the second threaded fastener 166 until the nut 174 reaches the end of the threaded fastener 166 and the flange 176 is spaced apart from the grommet by a predetermined distance. In this respect, the nut 174 may provide clearance for adjusting the vertical scope of the radar module 102 by approximately five degrees. However, the nut 174 may be spaced apart from the grommet by other distances and may permit adjustment of the vertical scope of the radar by more or less than five degrees. In addition, the nut 174 may remain spaced apart from the grommet to facilitate with retaining the radar module on the stud, if the grommet becomes detached from the ball portion during, for example, a vehicle collision. However, the threaded fastener may extend further toward the ball portion, and the flange may engage the grommet to hold the grommet radially compressed against the ball portion.

Figure 4:
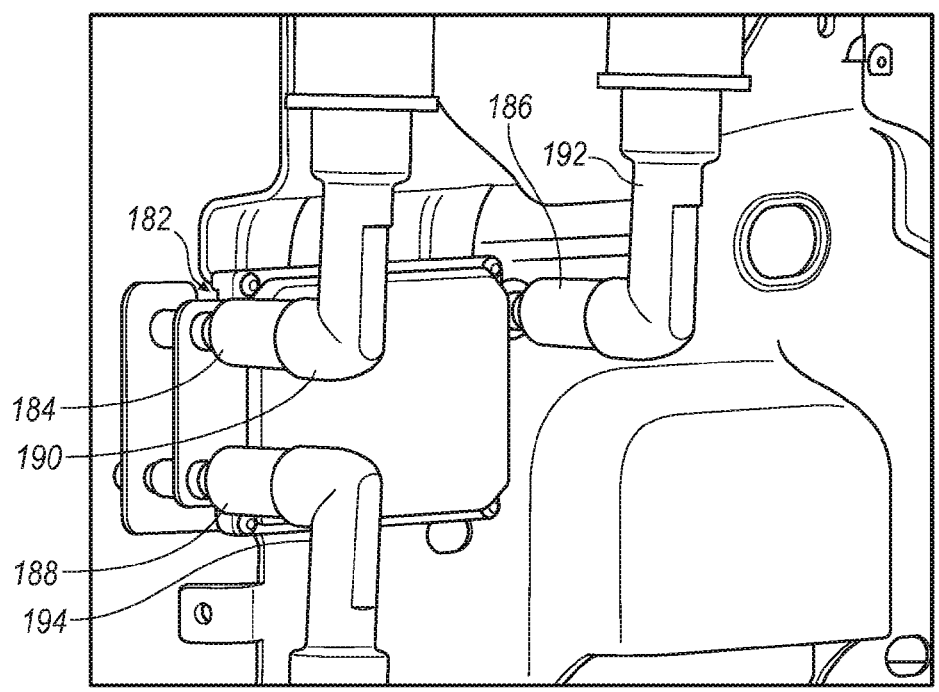
FIG. 4 illustrates a perspective view of the device of FIG. 1, illustrating the device being operated to install the radar module to the bumper module.

Referring to FIG. 4, the device may further include an adjustment mechanism 182 that may connect to the nuts, studs or any combination of these components to determine whether the radar module has been mounted to the bumper within requisite tolerances. To that end, the adjustment mechanism may include a series of sensors 184, 186, 188 to detect the position of the radar module, a controller (not shown) to determine based on input signals received from the sensors whether the nuts and radar module need to be adjusted and a series of torque applicators 190, 192, 194 to adjust the torque on one or more nuts. However, it will be appreciated that the device may other suitable adjustment mechanism or even omit the same.

Figure 5:
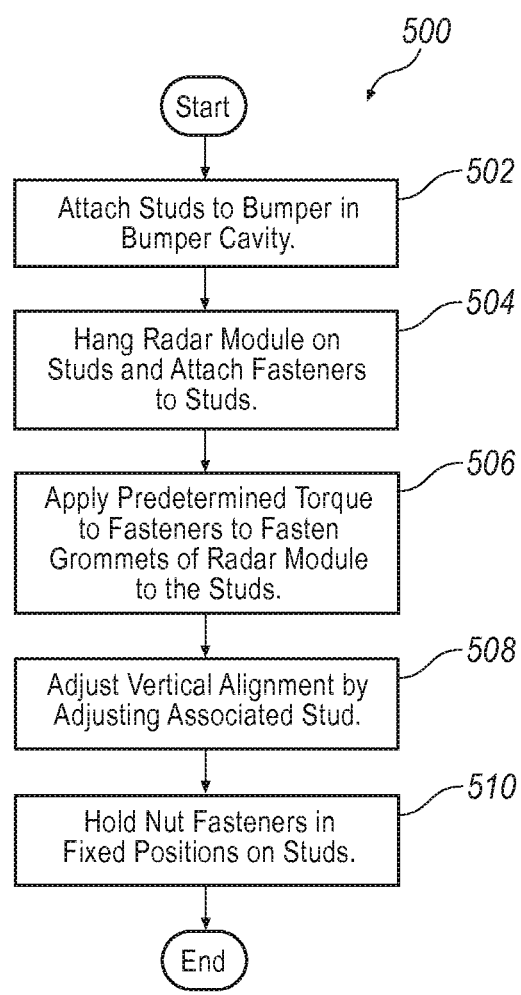
FIG. 5 is a flowchart of a process for operating the device of FIG. 1.

Referring to FIG. 5, a flowchart of one embodiment of a process 500 for operating the device 100 of FIGS. 1, 2A and 3A, to ergonomically install and adjust the radar module on the vehicle bumper. The process 500 may implement an efficient operation to accurately position the radar module on the vehicle bumper, so as to align the horizontal scope and the vertical scope of the radar module. Further, this process may be ergonomically beneficial to the extent that it may be implemented on a moving assembly line in an assembly plant or other manufacturing facility.

At step 502, the studs of the radar mounting device are attached to the vehicle bumper. For example, two threaded horizontal alignment studs may be fixedly attached to the vehicle bumper within a cavity formed by the bumper. In particular, the studs may be disposed at a predetermined height on the bumper for aligning the radar module at a predetermined horizontal angle. However, the process may include fixedly attaching more or less than two horizontal aligning studs to the bumper. In addition, a vertical alignment stud may be attached to the bumper for vertically aligning the radar module. The vertical alignment stud may be a threaded stud with a hex head, such that the stud may be rotated for adjusting the vertical tilt or cant of the radar module. However, the process may include attaching more or less than one vertical alignment stud to the bumper.

At block 504, the radar module may be hanged on the studs. This step may be accomplished by inserting the studs through a plurality of grommets, which are carried within apertures of the radar module, and fastening a plurality of nut fasteners to a respective one of the studs. An operator may manually fasten the nuts to the studs. However, any suitable mechanism may attach the nuts to the studs.

At block 506, the grommets may be fastened to the studs. This step may be accomplished by utilizing a torque wrench or other applicator to apply a predetermined torque to the nuts, sequentially. As one example, each grommet may be made of resilient material and movable between an unlocked position and a locked position, such that the torque wrench and nut fasteners apply sufficient force to the respective grommets so as to permit each grommet to snap into its locked position around the ball portion of the stud, leaving a gap between each nut and associated grommet. In this respect, the nuts may engage the grommets so as to form the grommets around ball portions of the studs. However, the nuts may engage the grommets in various other ways to fasten the grommets to the studs. The studs may have external threading that terminates at a predetermined distance from the grommets so as to prevent the nut from damaging the grommet. After the ball portions of the studs are seated within the grommets, the nuts may be spaced apart from the respective grommets to permit the grommets to freely rotate on the studs to permit adjustment of the radar module.

At block 508, the radar module may be aligned in a vertical direction. This step may be accomplished by rotating the vertical alignment stud supporting the radar module so as to control the move the stud axially through a threaded hole in the bumper and adjust the pitch of the module. For example, a torque applicator may engage a hex head on the vertical alignment stud to turn or rotate the stud until the radar module is aligned in a desired position. The vertical alignment stud may be spaced apart from the horizontal alignment studs so as to permit adjustment of the pitch or angle of the radar module.

At block 510, the nut fasteners may be held onto or secured to the studs. In particular, an adhesive patch, coating or other application may bond the nut fasteners to the studs and hold them in fixed positions on the respective studs, such that the nuts may hold the radar module on the studs if the a sudden vibration or other force unseats or otherwise detaches the grommets from the ball portions of the studs.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A process for operating a radar mounting device to install a radar module on a vehicle bumper, comprising:
   attaching studs of a radar mounting device to a vehicle bumper;
   hanging the radar module on the studs; and
   fastening grommets having flexible tabs to the studs by snap-fitting the flexible tabs around a ball portion of each stud and fastening a nut to a respective one of the studs.

2. The process of claim 1, wherein attaching the studs to the vehicle bumper comprises fixedly attaching a pair of horizontal alignment studs to the vehicle bumper at a predetermined height for horizontally aligning the radar module.

3. The process of claim 2, wherein attaching the studs to the vehicle bumper comprises rotatably attaching a vertical alignment stud to the vehicle bumper for vertically aligning the radar module.

4. The process of claim 1, wherein fastening the grommets to the studs further comprises applying a predetermined torque to the nut.

5. The process of claim 1, wherein aligning the radar mounting device in the vertical direction comprises rotating a vertical alignment stud supporting the radar module.

6. The process of claim 5, wherein the vertical alignment stud is spaced apart from a pair of horizontal alignment studs.

7. The process of claim 1, further comprising holding the nut on the respective one of the studs by applying an adhesive patch between the nut and the respective one of the studs.

8. A method of installing a radar module on a bumper, comprising:
   attaching at least one stud to a vehicle bumper, the stud having a ball portion;
   hanging a radar module on the stud by receiving the stud in a grommet of the radar module, the grommet having a plurality of flexible tabs; and
   fastening a nut to the stud forcing the ball portion of the stud to be snap-fit within the flexible tabs of the grommet.

9. The method of claim 8, wherein fastening the nut to the stud forces the ball portion of the stud to be seated within the grommet in a locked position.

10. The method of claim 8, further comprising unfastening the nut allowing the ball portion of the stud to be removed from the grommet in an unlocked position.

* * * * *